Jan. 1, 1963　　　A. R. RICHMOND　　　3,071,199
PORTABLE EARTH BORING MACHINE
Filed Feb. 21, 1961　　　3 Sheets-Sheet 1
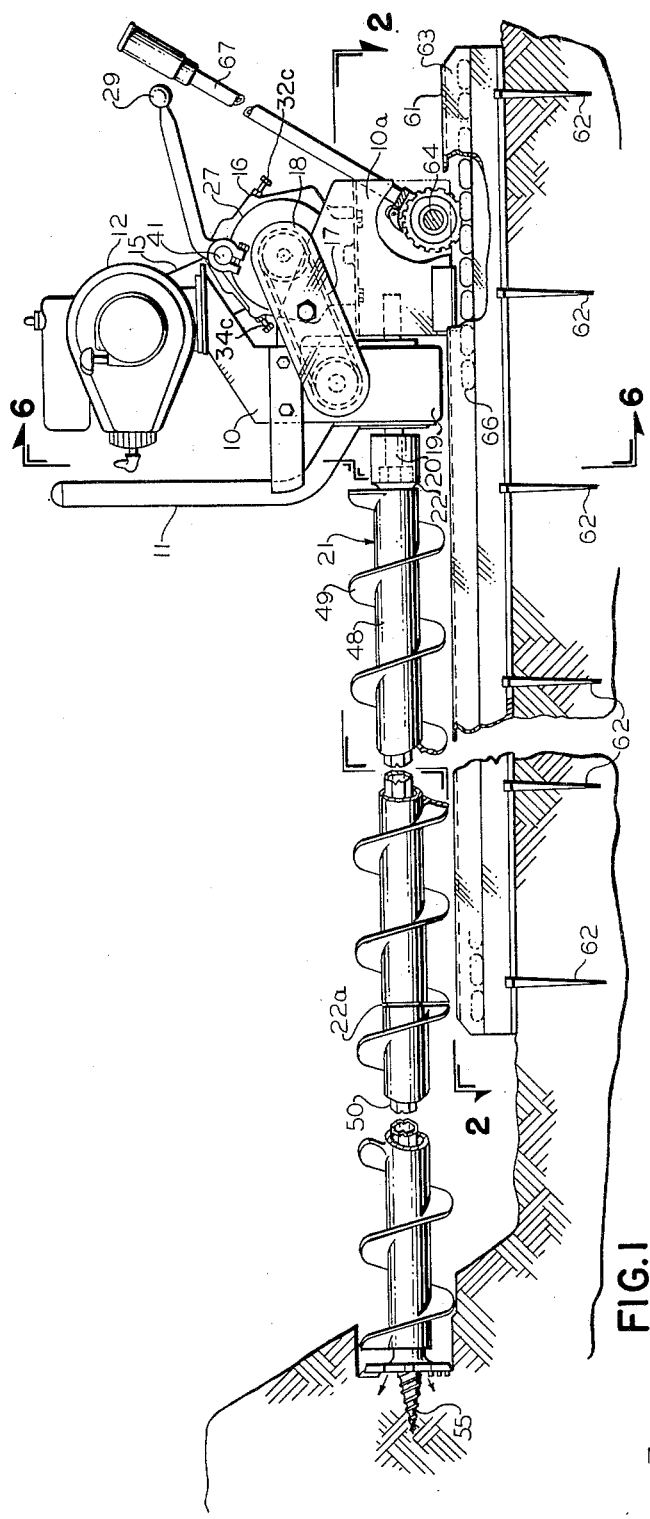
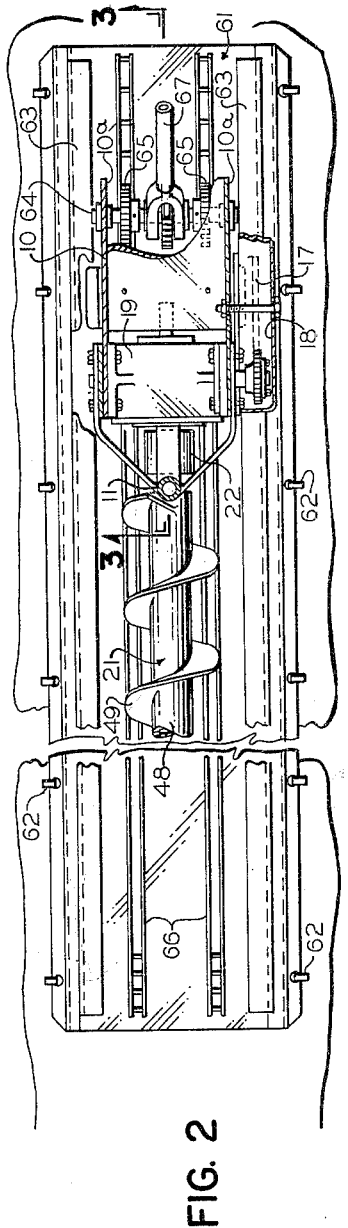
FIG.1
FIG. 2
*INVENTOR.*
ALBERT R. RICHMOND
*BY*
MAHONEY MILLER & RAMBO ATTY'S.

INVENTOR.
ALBERT R. RICHMOND
BY
MAHONEY MILLER & RAMBO ATTY'S.
Wm. V. Miller

Jan. 1, 1963   A. R. RICHMOND   3,071,199
PORTABLE EARTH BORING MACHINE
Filed Feb. 21, 1961   3 Sheets-Sheet 3
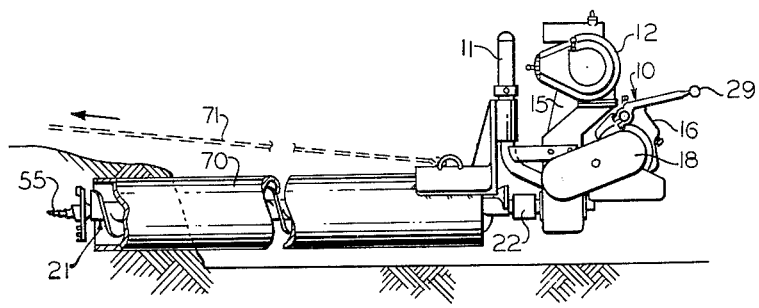
FIG. 8
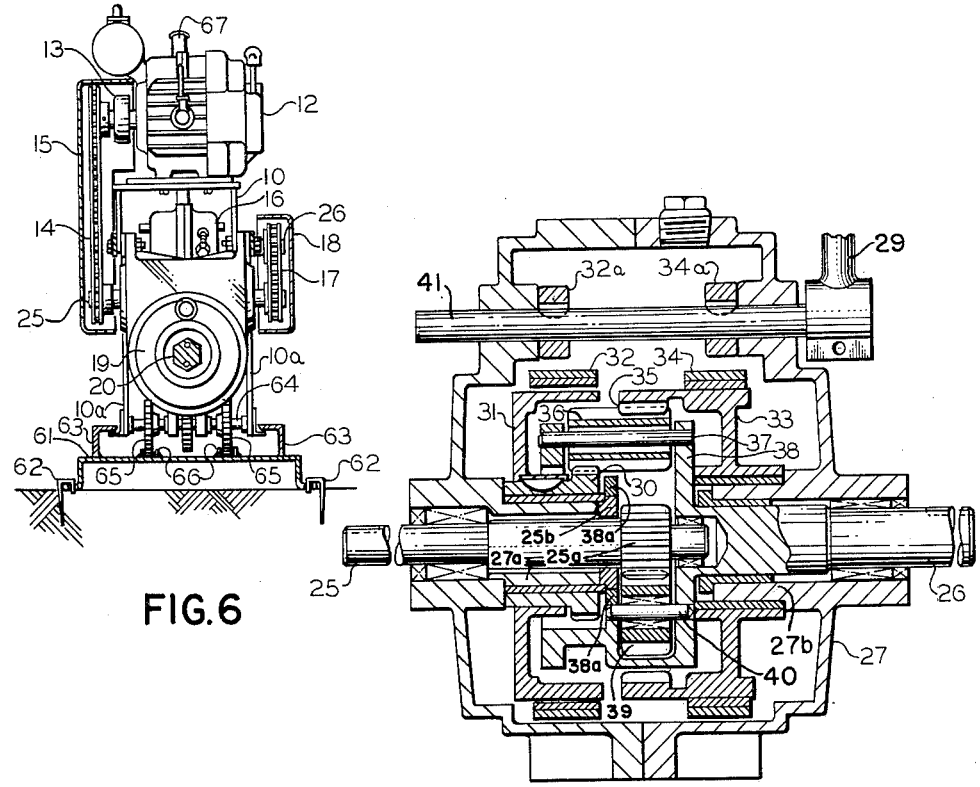
FIG. 6
FIG. 7
INVENTOR.
ALBERT R. RICHMOND
BY
MAHONEY MILLER & RAMBO ATTY'S.
Wm. V. Miller

United States Patent Office 3,071,199
Patented Jan. 1, 1963

3,071,199
PORTABLE EARTH BORING MACHINE
Albert R. Richmond, 163 Heath Road, Newark, Ohio
Filed Feb. 21, 1961, Ser. No. 90,796
2 Claims. (Cl. 175—170)

My invention relates to a portable earth boring machine. It has to do, more particularly, with a self-contained portable earth boring machine which includes a power unit or engine of the internal combustion type. More specifically, the machine is designed for use in boring holes for the reception of pipe lines where excavating is undesirable.

Self-contained boring machines have been provided in the past for use in installing large pipe lines. However, these machines, because of their cumbersome and complicated nature and resulting expense, have not been suitable for small pipe-line jobs. Small pipe line boring jobs have usually been accomplished by the use of units which must receive their power from an external source, for example, by electrically driven boring machines which must have a source of current, such as a generator or power line, or by air driven boring machines which must have a source of compressed air such as a compressor. As far as I am aware, no suitable self-contained boring machine, not requiring an external source of power, readily operable by and movable from place to place by one man, has been provided in the prior art. It is, therefore, the main object of my invention to provide such a machine.

According to my invention, I provide a boring machine which can be easily handled by one man since it is relatively small and lightweight. This machine includes a driving engine of the internal combustion, preferably gasoline, type. Connected to and driven by the engine is an auger or bit which includes a number of sections that may be successively added as the boring progresses. The engine is connected to the auger or bit by means which permits instantaneous reversing of the auger to work out hard materials, such as rocks, from the bore. This possibility of quick reversal to permit alternate feed and withdrawal of the auger is an important feature which makes my machine practical.

In the accompanying drawings, I have illustrated a preferred embodiment of my invention but it is to be understood that specific details may be varied without departing from basic principles.

In these drawings:

FIGURE 1 is a side elevational view of a boring machine embodying my invention and illustrating how it is used.

FIGURE 2 is a horizontal sectional view, partly broken away, taken along line 2—2 of FIGURE 1.

FIGURE 6 is a transverse sectional view taken along line 6—6 of FIGURE 1.

FIGURE 7 is an enlarged sectional view through the reversing unit taken along line 7—7 of FIGURE 3.

FIGURE 8 is a view in side elevation showing a different supporting and advancing arrangement for the machine.

Figure 3:
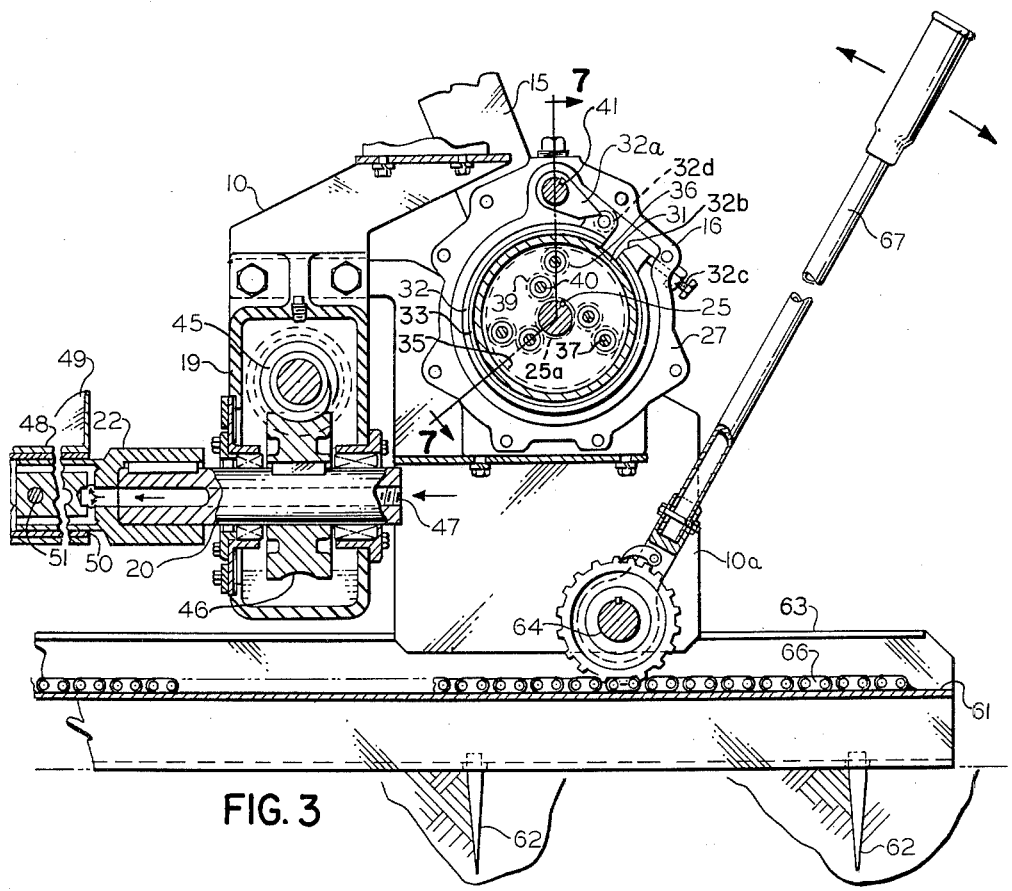
FIGURE 3 is an enlarged vertical sectional view, partly broken away, taken along line 3—3 of FIGURE 2.
Figure 4:
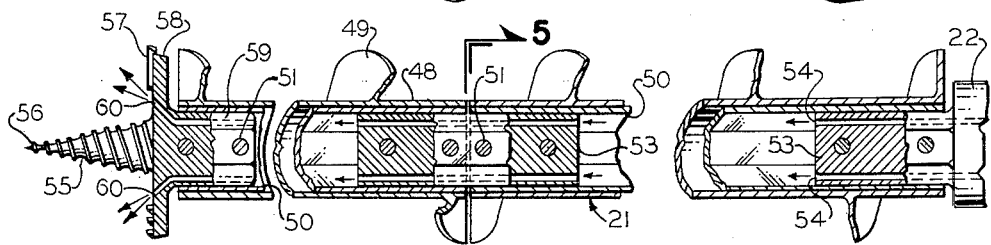
FIGURE 4 is an axial sectional view showing the auger or bit structure.
Figure 5:
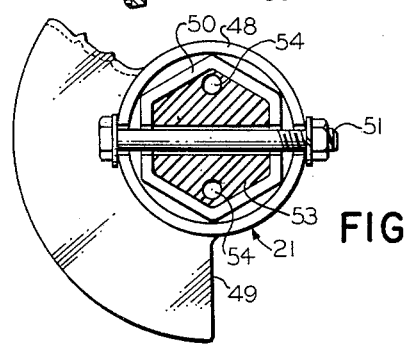
FIGURE 5 is an enlarged transverse sectional view taken along line 5—5 of FIGURE 4.

With reference to the drawings, in FIGURES 1 to 3, inclusive, and 6, I have illustrated the basic structure of my boring machine. The machine includes a main upright frame 10 which is suitably fabricated to rigidly support the various parts of the machine and to withstand the torque reaction during the boring operation. To prevent twisting of the machine during the boring operation an upstanding torque bar 11 is rigidly fastened to the frame 10 to serve as a handle by means of which the torque force, which tends to rotate the machine, can be resisted.

The upstanding frame 10 carries at the upper end thereof a driving motor 12 of the internal combustion type. This motor may be any suitable standard make. The drive shaft extends to one side from this engine and, as shown in FIGURE 6, drives a clutch 13. This clutch may be of any suitable standard type but is preferably of the centrifugal type so that it will engage only after the engine 12 reaches a predetermined speed. This clutch 13 drives a rearwardly and downwardly extending sprocket and chain drive 14 which is covered by a guard 15 attached to the frame 10. This chain and sprocket drive 14 drives a transversely disposed reversing transmission unit 16 which, in turn, drives a sprocket and chain drive 17 that extends downwardly and forwardly at the opposite side of the machine, being enclosed by a guard 18. This latter chain and sprocket drive 17 drives a speed reducing unit 19 in the form of a gear reduction unit. This gear reduction unit 19 has the output shaft 20 which receives the coupling 22 on the rear end of the shaft of the auger indicated generally by the numeral 21. Thus, between the engine 12 and the auger there is a power transmission means which includes the centrifugal clutch 13, the reversing unit 16 and the gear reduction unit 19. The reversing unit 16 is very important to the operation of the machine and must be of such a nature that it can be quickly, smoothly, and selectively actuated between neutral, forward and reverse positions. The detailed structure of this unit is illustrated best in FIGURES 3 and 7 and will now be described specifically.

The reversing transmission comprises the input shaft 25 which is driven by the drive 14 and the output shaft 26 which drives the drive 17, these shafts projecting from opposite sides of a suitable oil-tight housing 27. The housing 27 is preferably fabricated in two mating sections, as shown by FIGS. 3, 6 and 7, for convenience of manufacture and assembly. The transmission 16 is centrally mounted on the machine relative to the longitudinal axis thereof, as shown in FIG. 6 and the housing 27 is shown disassembled in FIG. 3 with the remainder of the transmission appropriately sectioned. This transmission is of the epicyclic gear type and includes a train of gears so arranged and so controllable that the output shaft 26 can be stopped, can be driven in a forward direction and can be driven in a reverse direction. Furthermore, the unit can be controlled by a single lever 29, movable in one direction from neutral to drive the output shaft in a forward direction and in the opposite direction from neutral to drive the output shaft in a reverse direction.

A sun gear 30 is rotatably mounted on the housing 27 around the inner portion of the shaft 25 and is rotatable relative thereto. The gear 30 is journaled on a tubular hub 27a formed with the housing 27 and coaxial with the shaft 25. Disposed around the gear 30 is a brake drum 31 which is keyed thereto and cooperating with this drum is a surrounding contractible brake band 32. One end of the brake band 32 (see FIG. 3) is provided with a radially extending lug 32b which is engageable with an adjustable stop bolt 32c. The bolt 32c is threaded in an opening in the housing 27. Secured to the opposite end of the brake band 32 is a rotatable cam follower 32d. A second opposed brake drum 33 is provided and is rotatably mounted on the housing for rotation relative to the output shaft 26 with which it is associated. The brake drum 33 is journaled on a tubular hub 27b which is formed with this section of the housing 27 and is coaxial with the shaft 26. A brake band 34 surrounds and cooperates with this drum. The brake band 34 is constructed similarly to the brake band 32 and includes a lug 34b and a rotatable cam follower 34d. The brake band 34, however, is mounted oppositely of the brake band 32 and the associated adjustable stop bolt 34c is threaded in on opening in the opposite side of the housing 27 (see FIG. 1). The drum 33 has an internal gear portion 35 which meshes with three elongated planetary pinions 36 (FIGURE 3) which are equally angularly spaced within the internal gear. Each pinion 36 is rotatably carried by a stud 37 which, in turn, is carried by a gear cage 38 which is integral or fixed with the output shaft 26. The gear cage 38 also rotatably carries three other idler planetary pinions 39 by means of studs 40 and it will be noted that each pinion 39 also engages a gear 25a formed on the inwardly disposed end of the shaft 25 as well as the associated pinion 36. The gear cage 38 is of cylindrical form having an annular flange 38a extending radially inward therefrom for support of the studs 40. A spacing collar 25b is disposed around the shaft 25 between the housing 27 and the gear 25a to prevent axial movement of the shaft. The control lever 29 is keyed to a control shaft 41 which extends transversely through the upper portion of the housing 27 and is rotatably mounted therein. This shaft has keyed on it two axially spaced cams 32a and 34a for contracting the respective cam followers 32d and 34d upon proper swinging of the lever 29. The cams 32a and 34a extend in opposite directions and rotation of the shaft 41 in one direction will cause only one cam to engage its associated cam follower. Engagement of one of the cams with a cam follower contracts the brake band which in turn is clamped on the brake drum. Referring to FIG. 3, rotation of the shaft 41 in a clockwise direction brings the cam 32a into engagement with the cam follower 32d, as shown, urging the cam follower toward the lug 32b. Thus, the brake band 32 will be contracted and clamped onto the brake drum 31. The brake bands 32 and 34 are preferably fabricated from a resilient material and, upon release of the lever 29, the brake bands will expand and release the brake drums. The operation of the brake band 34 is similar except that a counterclockwise rotation of the shaft 41 is required to contract the brake band.

When the control lever 29 is in the forward position, the forward clutch or brake band 32 is clamped on the drum 31 and the drum will not rotate. The planetary pinions 39, driven by the input shaft gear 25a, will drive the pinions 36 and they will be forced to roll around the sun gear 30, turning the cage or planet carrier 38 and the output shaft 26 in the same direction as the input shaft 25. When the lever 29 is in the neutral position, neither band 32 or 34 is engaged with the drum and both drums are free to rotate. The planetary pinions driven by the sun gear 30 will now rotate freely on their own centers forcing the free drums 31 and 33 to revolve. The gear cage 38 does not rotate and thus the output shaft 26 is not driven. When the control lever 29 is in the reverse position, the reverse band 34 is clamped to the drum 33 and that drum will not rotate. The planetary pinions are now forced to roll in the stationary internal gear 35, turning the gear cage or carrier 38 and the output shaft 26 in the opposite direction to the input shaft 25.

Thus it will be apparent that the machine may be readily controlled to drive the auger 21 in a forward or reverse direction or to stop it completely. This is accomplished by the forward or reverse movement of the single lever 29. Because of this arrangement, it is possible to quickly reverse the auger to work out hard materials, such as rocks, from the bore.

The gear unit 19 is preferably of the worm and gear type, as shown in FIGURE 3, including the driving worm 45 and the driven gear 46 which is keyed to the output shaft 20. This output shaft 20 has a bore 47 extending therethrough through which water may be forced from a suitable supply means (not shown) to the auger 21.

The auger 21 is preferably of the structure shown in FIGURES 1 to 5, inclusive. It includes a tubular outer sleeve 48 which carries the helically disposed material removing blade 49. This circular cross-section sleeve 48 surrounds a polygonal or angular sleeve 50 which is shown as being of hexagonal cross-section. The sleeves 48 and 50 are in longitudinal sections which are connected together by hexagonal connector blocks 53 that fit or telescope in adjacent ends of the sleeve sections 50 and are bolted to the sleeve sections 48 and 50 by the transverse bolts 51. The blocks 53 have bores 54 extending therethrough to permit passage of water. The forwardmost section of the auger will have a cutting bit 55 thereon which will include a bit end 56 having a helical cutting edge and radial cutters 57 positioned adjacent the outer edge of a plate 58. A coupling portion 59 of angular form will fit in the forward end of the sleeve 50 and may be held therein by the bolts 51. The bit is also provided with openings 60 through which water may be supplied to aid in removing the bored material.

It will be apparent that the machine should be mounted for gradual forward movement as the bore progresses. For this purpose the machine is preferably slidably mounted on a guideway 61 (FIGURES 1, 2, 3 and 6) which may be held in proper position against the rearward thrust, developed during the boring operation, by means of stakes 62. The frame 10 of the machine is provided with a depending guide portion 10a which is disposed between the guide flanges 63 of the guideway 61, this depending portion 10a being provided with a rotatable transverse shaft 64 which carries gears 65 that engage racks 66 carried by the guideway 61 and extending longitudinally thereof. The shaft 64 is rotated by means of a ratchet lever 67 and it will be apparent that the resulting rotation of the gears 65 will advance the machine along the guideway to feed the auger forwardly as the boring operation progresses. Additional sections of the auger may be inserted from time-to-time by withdrawing the machine rearwardly along the guideway 61 to its original starting point.

Another way in which the machine may be mounted for progressive forward feeding is illustrated diagrammatically in FIGURE 8. This means comprises a tube 70 which encloses the auger and which is pulled forwardly, such as by a tractor, by means of a cable 71. The tube 70 will be formed of separate sections which can be coupled together as additional sections of the auger 21 are inserted.

It will be apparent from the above description that I have provided a boring machine which can be handled easily by one man since it is relatively small and light weight. The machine is self-contained, receiving its power from an internal combustion engine and the drive to the auger is through a transmission which includes a reversible unit. Reversing can be accomplished quickly and smoothly to permit working out of hard material from the bore.

Various other advantages will be apparent.

According to the provisions of the patent statutes, the principles of this invention have been explained and have been illustrated and described in what is now considered to represent the best embodiment. However, it is to be understood that, within the scope of the appended claims, the invention may be practiced otherwise than as specifically illustrated and described.

Having thus described my invention, what I claim is:

1. An earth boring machine comprising an upstanding supporting frame, a driving motor of the internal combustion type mounted on the upper portion of the frame and having a drive shaft extending therefrom transversely of the frame to one side thereof, a clutch of the centrifugal type driven by the drive shaft, a rearwardly and downwardly extending first sprocket and chain drive driven by the clutch, a reversing transmission unit of the mechanical type having an input shaft driven by said chain and sprocket drive and an output shaft with both shafts disposed transversely of the frame in substantially parallel relationship to the engine drive shaft, a second chain and sprocket drive driven by said output shaft and extending downwardly and forwardly at the side of the frame opposite to the position of the first sprocket and chain drive, a gear reduction unit mounted on the lower and forward portion of said frame having an input shaft transversely of the frame driven by said second chain and sprocket drive and an output shaft extending forwardly therefrom and driving an axially disposed chuck which receives and drives an auger.

2. An earth boring machine comprising an upstanding supporting frame, a driving motor of the internal combustion type mounted on the upper portion of the frame and having a drive shaft extending therefrom transversely of the frame to one side thereof, a rearwardly and downwardly extending first sprocket and chain drive driven by the drive shaft, a reversing transmission unit of the mechanical type having an input shaft driven by said chain and sprocket drive and an output shaft with both shafts disposed transversely of the frame in substantially parallel relationship to the engine drive shaft, a second chain and sprocket drive driven by said output shaft and extending downwardly and forwardly at the side of the frame opposite to the postion of the first sprocket and chain drive, a gear reduction unit mounted on the lower and forward portion of said frame having an input shaft transversely of the frame driven by said second chain and sprocket drive and an output shaft extending forwardly therefrom and driving an axially disposed chuck which receives and drives an auger.

References Cited in the file of this patent

UNITED STATES PATENTS

| | | |
|---|---|---|
| 1,310,274 | Branning | July 15, 1919 |
| 1,699,936 | Watchorn | Jan. 22, 1929 |
| 1,928,048 | Currens | Sept. 26, 1933 |
| 1,932,068 | Engelbright et al. | Oct. 24, 1933 |
| 2,196,475 | Reed | Apr. 9, 1940 |
| 2,400,478 | Beck | May 21, 1946 |
| 2,625,376 | Smith | Jan. 13, 1953 |
| 2,831,659 | Kukuchek et al. | Apr. 22, 1958 |
| 2,914,305 | Wink | Nov. 24, 1959 |
| 2,976,942 | Pitcher | Mar. 28, 1961 |